United States Patent
Hausner et al.

(10) Patent No.: US 12,202,547 B2
(45) Date of Patent: Jan. 21, 2025

(54) SUPPORT DEVICE OF A FRONT END MODULE, AND VEHICLE COMPRISING A SUPPORT DEVICE

(71) Applicant: Bayerische Motoren Werke Aktiengesellschaft, Munich (DE)

(72) Inventors: Timo Hausner, Munich (DE); Arne Koehler, Pliening (DE); Haci Korkusuz Janket, Putzbrunn (DE); Stefan Wallner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 287 days.

(21) Appl. No.: 17/789,841

(22) PCT Filed: Feb. 3, 2021

(86) PCT No.: PCT/EP2021/052461
§ 371 (c)(1),
(2) Date: Jun. 29, 2022

(87) PCT Pub. No.: WO2021/165036
PCT Pub. Date: Aug. 26, 2021

(65) Prior Publication Data
US 2023/0060018 A1    Feb. 23, 2023

(30) Foreign Application Priority Data
Feb. 18, 2020   (DE) ............... 10 2020 104 247.7

(51) Int. Cl.
*B62D 25/08*     (2006.01)
*B60R 11/00*     (2006.01)

(52) U.S. Cl.
CPC .............. *B62D 25/08* (2013.01); *B60R 11/00* (2013.01); *B60R 2011/004* (2013.01)

(58) Field of Classification Search
CPC ....... B62D 25/08; B62D 25/085; B60R 11/00; B60R 2011/004; B60R 2019/1886; B60R 2019/525; B60R 19/483
See application file for complete search history.

(56) References Cited

U.S. PATENT DOCUMENTS

| | | | |
|---|---|---|---|
| 2016/0368367 A1 | 12/2016 | Schoening et al. | |
| 2019/0300062 A1* | 10/2019 | Yoo | ............... B60R 19/18 |
| 2020/0324739 A1* | 10/2020 | Singh | ............... B62D 25/085 |

FOREIGN PATENT DOCUMENTS

| | | | | |
|---|---|---|---|---|
| CN | 102811888 A | * | 12/2012 | ............. B60R 19/18 |
| CN | 103442975 A | * | 12/2013 | ............. B62D 25/08 |

(Continued)

OTHER PUBLICATIONS

International Search Report (PCT/ISA/210) issued in PCT Application No. PCT/EP2021/052461 dated Mar. 15, 2021 with English translation (five (5) pages).

(Continued)

*Primary Examiner* — Lori Lyjak
(74) *Attorney, Agent, or Firm* — Crowell & Moring LLP

(57) ABSTRACT

A support device of a front end module of a vehicle is provided for fastening the front end module to a vehicle structure. The support device has a frame component. The frame component is provided for attaching a bumper cover and/or a decorative grille and for attaching at least one sensor. The support device has at least one movement device by which the frame component can move relative to the vehicle structure. A vehicle includes the support device and a vehicle structure, wherein the support device is mounted on the vehicle structure via the at least one movement device so that, in the event of an impact at low speed, the support device moves in the direction of the vehicle structure and, after the impact, moves away from the vehicle structure again into its initial position.

11 Claims, 1 Drawing Sheet

(56) References Cited

FOREIGN PATENT DOCUMENTS

| DE | 200 13 385 U1 | 11/2000 | | |
|----|----|----|----|----|
| DE | 10031526 A1 | * | 1/2002 | ............ B60R 19/12 |
| DE | 102016201467 A1 | * | 8/2017 | |
| DE | 10 2016 213 931 A1 | | 2/2018 | |
| DE | 10 2018 210 094 A1 | | 12/2019 | |
| DE | 102022122588 A1 | * | 3/2024 | |
| EP | 0437781 A2 | * | 7/1991 | |
| EP | 1002700 A2 | * | 5/2000 | ............ B60R 19/40 |
| EP | 3 106 339 A1 | | 12/2016 | |

OTHER PUBLICATIONS

German-language Written Opinion (PCT/ISA/237) issued in PCT Application No. PCT/EP2021/052461 dated Mar. 15, 2021 (six (6) pages).

German-language Search Report issued in German Application No. 10 2020 104 247.7 dated Oct. 27, 2020 with partial English translation (13 pages).

"Part 581—Bumper Standard," Code of Federal Regulations, Title 49 Transportation, Parts 572 to 999, Oct. 1, 2018, pp. 309-312, www.govinfo.gov/content/pkg/CFR-2018-title49-vol7/pdf/CFR-2018-title49-vol7-part581.pdf (seven (7) pages).

Regelung Nr. 42; Einheitliche Vorschriften fuer die Genehmigung der Kraftfahrzeuge hinsichtlich ihrer vorderen und histeren Schutzeinrichtungen (Stossstangen usw.) In: Bundesanzeiger-Verl: Bundesgesetzblatt Teil / 2 / Anlage-Band. 1983, H. 25, S. pp 31-47. ISSN 0341-1109 (20 pages).

\* cited by examiner

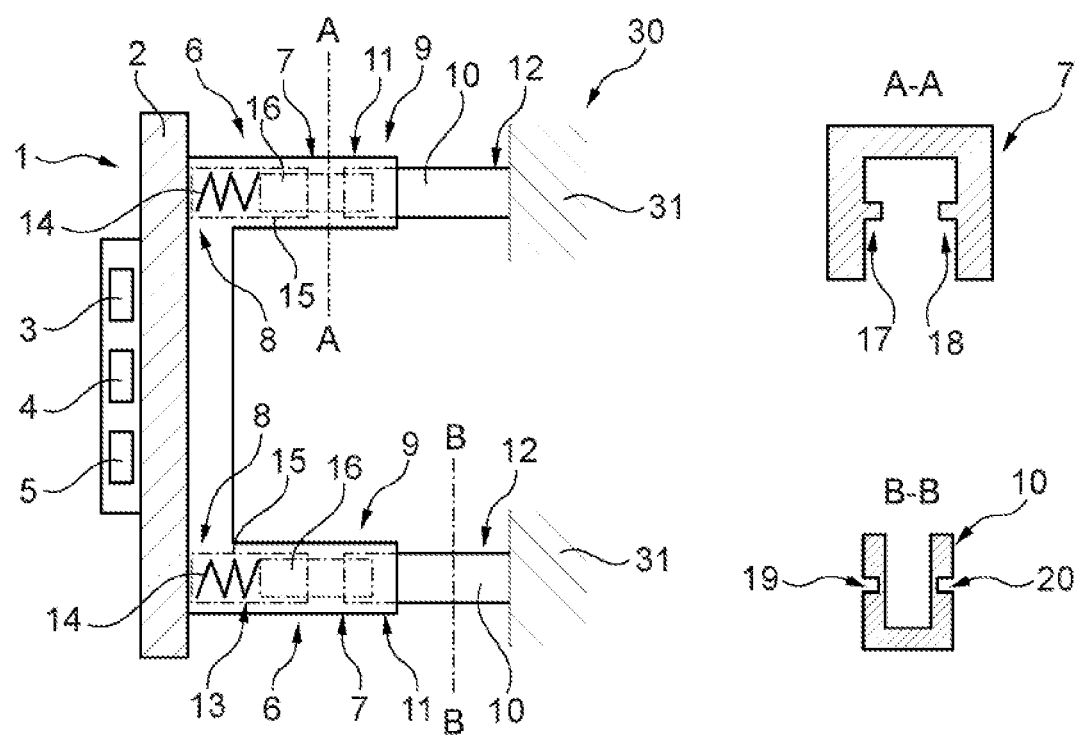

SUPPORT DEVICE OF A FRONT END MODULE, AND VEHICLE COMPRISING A SUPPORT DEVICE

BACKGROUND AND SUMMARY

The present invention relates to a support device of a front end module of a vehicle for fastening the front end module to a vehicle structure, and to a vehicle having such a support device and vehicle structure.

A modern front end module of a motor vehicle currently comprises, for example, a multiplicity of sensors for driver assistance systems, associated screens (e.g. a radome), a decorative grille and/or an air flap control.

In particular, driver assistance systems must meet statutory regulations (such as, for example, US Standard Part 581) for an impact at low speed, in order to obtain or be granted approval for public road transport. This is because these are intended to remain intact after, for example, a "parking bump" or an impact at low speed (max. 10 km/h), so that these can still do their job afterward.

In addition, likewise according to statutory requirements (for example ECE-R42), lighting elements of a vehicle which are located in the area of a front end module must also remain undamaged in the event of an impact at low speed.

In this connection, DE 10 2016 213 931 A1 is known. This reference discloses a fender arrangement for a passenger car having a crossmember which extends in one direction of extent and having a shock absorber, which is arranged on a side surface of the crossmember that extends in the direction of extent. The shock absorber is formed with an absorber material which has directionally dependently a different stiffness, a different load absorption capacity and/or a different deformability locally with respect to pressure and/or impact.

Here, the absorber material has a foam as the material, in which supporting elements are embedded.

As a result, the absorber material is intended to resolve the target conflict for various load cases of the fender arrangement at different speeds, so that requirements with a contradictory character are combined.

In other words, firstly, for speeds in the range up to 5 km/h, a very hard and stable fender structure is to be created in order, for example, to avoid the damage to the front flap and the headlights in the event of a collision—for example in the event of parking bumps.

Secondly, the passive pedestrian protection for speeds in the range from about 20 km/h to 50 km/h is intended to provide a soft fender structure.

However, such a structure has diverse parts, which must be matched to one another and which increase the outlay on assembly.

In the light of the aforementioned prior art, it is an object of the present invention to provide a support device of a front end module of a vehicle for fastening the front end module to a vehicle structure which, firstly, generates an alternative to the prior art and, secondly, can preferably be produced more cost-effectively with less outlay on assembly and also ensures an improved impact protection function at different impact speeds.

According to the invention, this object is achieved by the features of the independent claims. Advantageous refinements are specified in the dependent claims.

According to the invention, in a first aspect, a support device of a front end module of a vehicle for fastening the front end module to a vehicle structure comprises:

a frame component for attaching a fender cover and/or a decorative grille and for attaching at least one sensor, wherein the support device comprises at least one movement device, with which the frame component can be moved relative to a vehicle structure.

The frame component is therefore provided for attaching a fender cover and/or a decorative grille and for attaching at least one sensor.

With this design, it is possible to implement an improved impact protection function at different impact speeds. Thus, damage to the front flap and the headlights in the event of a collision at speeds in the range up to at most 10 km/h—for example during parking bumps—can therefore be avoided.

In addition, the passive pedestrian protection for speeds in the range from about 20 km/h to 50 km/h can be improved. In particular if the movement device is configured with a moving element, which can have a spring and/or a damper, the impact protection function can be improved. This is done, for example, by means of the simple adaptation of the spring hardness of the aforementioned spring and/or the damper constant of the damper.

In addition, with this design it is possible that, in the event of an impact at low speed, the support device moves in the direction of a vehicle structure and, after the impact, moves back again from the vehicle structure into its initial position. Thus, the support device, together with its sensors, can assume its envisaged position within a predefined tolerance range, in order thus to ensure the satisfactory function of the sensors.

The frame component can be the central component of a front end module of a vehicle. Its main task is to reinforce the front part of a vehicle or an automobile, wherein, for example, cooling components, headlights, air guides, spray water containers, a warning horn, air intake, decorative grille, body panels and/or sensors, such as LIDAR and so on, can be mounted on the frame component. The frame component can include steel, plastic, and/or a composite material.

Furthermore, the at least one movement device can have a guide part, with which a movement direction between the support device and a vehicle structure of a vehicle can preferably be controlled.

Preferably, the guide part is rigidly fixed to the frame component or can be rigidly fixed to a vehicle structure, in particular to a vehicle frame.

Furthermore, provision can be made for the at least one movement device to have a guide part with a first and a second end.

Preferably, the guide part is fixed to the frame component or to a vehicle structure.

In addition, it is possible that the first or the second end is arranged on the frame component or on a vehicle structure.

It is also contemplated that the guide part has a rectilinear profile, in particular a U-shaped profile.

Furthermore, it may be that the guide part is designed as a profile of any desired shape and/or as a hollow profile.

Preferably, the guide part forms a rail, along which a moving part can be arranged such that it can travel. Thus, a linear guide can be implemented.

In addition, provision can be made for the at least one movement device to comprise a moving part, the relative movement of which, originating from the movement between the support device and a vehicle structure of a vehicle, is preferably guided by a guide part.

It is contemplated that the moving part is fixed to the vehicle structure or can be fixed to the frame component.

Furthermore, it is possible that the at least one movement device comprises a moving part which is designed to be movable relative to a guide part.

Preferably, the moving part comprises a groove for a rail of a guide part. Thus, a linear guide can be implemented.

Furthermore, it may be that the moving part comprises a first and a second end.

Further, provision can be made for the first end of the moving part to be arranged opposite the first end of the guide part and for the second end of the moving part to be arranged opposite the second end of the guide part.

It is also possible that the first or the second end of the moving part is arranged on the frame component or on a vehicle structure.

Preferably, the at least one movement device comprises a moving element, which is preferably used to reverse the movement of the support device relative to a vehicle structure and to space the support device and the vehicle structure apart from each other to the initial position.

The moving element can be designed such that a first end of a moving part and a first end of a guide part are spaced apart at a maximum distance from each other and movably relative to each other, in particular under the action of an external force.

Moreover, it is contemplated that the moving element has a spring and/or a damper, in order preferably to store kinetic energy and/or to convert it into heat.

Preferably, the moving element has a sleeve part, in which a spring and/or a damper is arranged.

It may also be that the moving element comprises a traveling part which is designed to be telescopic with the sleeve part.

It is possible that the sleeve part is fixed to the guide part or to the moving part.

Furthermore, provision can be made for the traveling part to be fixed to the moving part or to the guide part.

In addition, it can be envisioned that two movement devices form a U-shaped profile.

Furthermore, provision can be made for the two opposite legs of the U shape each to be formed by a guide part.

Preferably, the leg which connects the two opposite legs is arranged on the frame component.

It is also possible that the three aforementioned legs are formed in one piece.

Furthermore, sensors, such as LIDAR (light detection and ranging) and/or MRR (medium-range radar sensor) and/or FRR (far range radar), and/or a radome (radar dome) and/or lighting elements for the lighting can be arranged on the frame component.

In addition, the support device can comprise at least two movement devices, which are installed on the frame component in such a way that a uniform deflection of the frame component in the direction of a vehicle structure can be ensured.

A second aspect of the present invention comprises a vehicle, in particular an automobile.

It is expressly pointed out that the features of the support device, as are mentioned under the first aspect, can be used individually or combinable with one another in the vehicle.

In other words, the features mentioned above under the first aspect of the invention relating to the support device can also be combined with further features here under the second aspect of the invention.

Preferably, a vehicle, in particular an automobile, comprises:
a support device according to the first aspect, and
a vehicle structure, wherein the support device is arranged on the vehicle structure via at least one movement device, so that in the event of an impact at low speed, the support device moves in the direction of the vehicle structure and, after the impact, moves back again from the vehicle structure into its initial position.

In the present description, a low speed is understood to be a speed of a maximum of 10 km/h.

Furthermore, it may be that the moving part of the movement device is arranged on the guide part of the movement device. Thus, a guided movement between the vehicle structure and the support device is possible.

Furthermore, it is possible that a plurality of movement devices, in particular five, connect the vehicle structure to the support device.

It is also contemplated that the movement devices are distributed uniformly on the frame component.

In the present description, a vehicle structure is understood to be a part of a vehicle frame or a vehicle frame or a supporting structure of a vehicle.

In the following, the idea of the invention illustrated above is additionally expressed in other words.

The prior art discloses sensors and associated screens (for example a radome), which are integrated into a front end module of a vehicle comprising fender cover, decorative grille, air flap control, and so on.

Thus, for example, driver assistance systems according to US Part 581 should also function even if a front end module comprising sensors of the driver assistance system has been subjected to an impact.

Consequently, after an impact which, for example, can be simulated in a pendulum test (US Part 581/ECE-R42), the sensors of the driver assistance system or lighting elements must again assume their position within a predefined tolerance range in such a way that they are available (again) after the impact.

To this end, a restoring system or a movement device is used such that the sensors and/or the lighting elements which are located in the area of this system remain undamaged.

It is possible that the installation location of the sensors (fixing component/assembly) is reversibly held and retained in its position on the vehicle by mechanical elements (for example compression springs, dampers).

If necessary, lighting elements can additionally be integrated in the area of decorative grilles. In US Part 581 and ECE-R42 and in pedestrian protection, the system can be deflected rearward. As a result, the system with all its components is intended to remain undamaged. After the pendulum test, the system can be reset into its original position or into the predefined tolerance range by the mechanical force elements.

MRR/FRR and LIDAR can be integrated into the frame of an air flap control or into a frame component.

The (heated) radome can, for example, be integrated into a decorative grille, which produces a connection to the frame of the air flap control or to a frame component via the fender cover.

The frame of the decorative grille can be illuminated by lighting elements and can thus itself become a lighting element in the assembly.

The frame of the air flap control or the frame component can be connected to a body (front wall) or a vehicle structure via a slotted guide or via a movement device.

In addition, the frame component or the frame of the air flap control can be kept in position under all driving conditions via preloaded spring assemblies.

In US Part 581 and ECE-R42, the system (air flap sensor+sensors, decorative grille+lighting elements, fender cover+radome) can be deflected rearward, in the direction of a vehicle structure. The system with all its components is intended to remain undamaged as a result.

After the pendulum test, the system can be reset into its original position or into the predefined tolerance range by the mechanical force elements.

The invention is explained in more detail below by using an exemplary embodiment in conjunction with an associated drawing.

BRIEF DESCRIPTION OF THE DRAWING

FIG. 1 is a schematic side view of a support device with sectional illustrations.

DETAILED DESCRIPTION OF THE DRAWING

FIG. 1 is a schematic side view of a support device 1 with sectional illustrations A-A and B-B.

In more detail, FIG. 1 shows a support device 1 of a front end module of a vehicle 30 for fixing the front end module to a vehicle structure 31.

Here, the support device 1 has a frame component 2 for fastening a fender cover and/or a decorative grille and for fastening sensors 3, 4, 5.

The support device 1 also comprises two movement devices 6, with which the frame component 2 can be moved relative to the vehicle structure 31.

As can be gathered from FIG. 1, the two movement devices 6 each have a guide part 7, which is rigidly fixed to the frame component 2.

The guide part 7 has a first end 8 and a second end 9, the first end 8 being arranged on the frame component 2.

Looking at FIG. 1, it can be seen that the guide part 7 has a rectilinear profile, in particular a U-shaped profile (cf. sectional illustration A-A).

Furthermore, the guide part 7 forms a rail, along which a moving part 10 can be arranged such that it can move. Here, the rail is formed with two projections 17, 18 (cf. sectional illustration A-A).

Each of the two movement devices 6 therefore has the moving part 10, which is fixed to the vehicle structure 31 and which is designed to be movable relative to the associated guide part 7.

Here, each moving part 10 has a groove or two grooves 19, 20 for the rail of a guide part 7 (cf. sectional illustration B-B).

In addition, each moving part 10 has a first end 11 and a second end 12, wherein the first end 11 of the moving part 10 is arranged opposite the first end 8 of the guide part 7, and the second end 12 of the moving part 10 is arranged opposite the second end 9 of the guide part 7.

The second end 12 of the moving part 10 is arranged on the vehicle structure 31.

Furthermore, each movement device 6 has a moving element 13, which is designed such that it spaces the first end 11 of the moving part 10 and the first end 8 of a guide part 7 at a maximum distance from each other and movably relative to each other.

Here, the moving element 13 has a spring 14 and/or a damper (not illustrated).

In addition, FIG. 1 shows that the moving element 13 has a sleeve part 15, in which the spring 14 and/or the damper is arranged.

Furthermore, each moving element 13 has a traveling part 16, which is designed to be telescopic with the sleeve part 15, the sleeve part 15 being fixed to the guide part 7, whereas the traveling part 16 is fixed to the moving part 10.

Looking at the two movement devices 6, it can be seen that these also form a U-shaped profile. Here, the two opposite legs of the U shape are each formed by one of the guide parts 7, as can be gathered from the left-hand part of FIG. 1, wherein the leg which connects the two opposite legs is arranged on the frame component 2. The three aforementioned legs are formed in one piece.

As described above, it can likewise be gathered from FIG. 1 that sensors 3, 4, 5, such as LIDAR 3, MRR 4 and FRR 5, are arranged on the frame component 2.

Furthermore, the two movement devices 6 are installed on the frame component 2 such that a uniform deflection of the frame component 2 in the direction of the vehicle structure 31 is ensured.

As likewise described above, FIG. 1 also shows a highly schematic vehicle 30, in particular an automobile.

This vehicle 30 has the above-described support device 1 and the vehicle structure 31.

The support device 1 is arranged on the vehicle structure 31 via the movement devices 6, so that, in the event of an impact at low speed, the support device 1 is moved in the direction of the vehicle structure 31 and, after the impact, moves back again from the vehicle structure 31 into its initial position.

It is also possible for more than two movement devices 6, in particular five, to connect the vehicle structure 31 to the support device 1, the plurality of movement devices 6 being uniformly distributed on the frame component 2.

As an alternative to the exemplary embodiment presented, it is possible that the movement devices 6 are rigidly fixed to the vehicle structure 31, in particular to the vehicle frame. Here, the guide part 7 is fixed to the vehicle structure 31, the second end 9 being arranged on the vehicle structure 31.

Furthermore, the moving part 10 is then fixed to the frame component 2, the first end 11 of the moving part 10 being arranged on the frame component 2.

In this alternative exemplary embodiment, each moving element 13 likewise has a traveling part 16, which is designed to be telescopic with the sleeve part 15 which is fixed to the guide part 7, the traveling part 16 being fixed to the moving part 10.

LIST OF DESIGNATIONS

1 Support device
2 Frame component
3 Sensor
4 Sensor
5 Sensor
6 Movement device
7 Guide part
8 First end
9 Second end
10 Moving part
11 First end
12 Second end
13 Moving element
14 Spring
15 Sleeve part
16 Traveling part
17 Projection
18 Projection
19 Groove 20 Groove
30 Vehicle
31 Vehicle structure

The invention claimed is:

1. A support device of a front end module of a vehicle for fastening the front end module to a vehicle structure, the support device comprising:
 a frame component for attaching a fender cover and/or a decorative grille and for attaching at least one sensor; and
 at least one movement device, with which the frame component is movable relative to the vehicle structure;
 wherein the at least one movement device comprises a guide part which is rigidly fixed to the frame component;
 wherein the at least one movement device comprises a moving part which is fixed to the vehicle structure;
 wherein the moving part is movably disposed within the guide part, wherein the guide part forms a rail along which the moving part is movable, wherein the rail has a first projection extending along an inside of a first wall of the rail and a second projection extending along an inside of a second wall of the rail, wherein the moving part has a first groove extending along an outside of a first wall of the moving part and a second groove extending along an outside of a second wall of the moving part, and wherein the moving part is movable along the guide part with the first projection of the rail disposed within the first groove of the moving part and the second projection of the rail disposed within the second groove of the moving part.

2. The support device according to claim 1, wherein the guide part has a first end and a second end, and the guide part has a rectilinear profile.

3. The support device according to claim 2, wherein the profile is a U-shaped profile.

4. The support device according to claim 1, wherein the moving part has a first end and a second end, and the first end of the moving part is arranged opposite a first end of the guide part, and the second end of the moving part is arranged opposite a second end of the guide part.

5. The support device according to claim 4, wherein the moving element is configured so as to space a first end of the moving part and a first end of the guide part at a maximum distance from each other and movably relative to each other.

6. The support device according to claim 1, wherein two movement devices form a U-shaped profile,
 two opposite legs of the U-shaped profile are each formed by a respective guide part, and
 a third leg which connects the two opposite legs is arranged on the frame component.

7. The support device according to claim 1, wherein the at least one sensor is arranged on the frame component.

8. The support device according to claim 7, wherein the at least one sensor is selected from a group comprising: LIDAR, MRR, FRR, a radome, and lighting elements for illumination.

9. A vehicle comprising:
 a support device according to claim 1;
 a vehicle structure, wherein
 the support device is arranged on the vehicle structure via the at least one movement device, so that, in an event of an impact at low speed, the support device moves in the direction of the vehicle structure and, after the impact, moves back again from the vehicle structure into its initial position.

10. The vehicle according to claim 9, wherein
 a plurality of movement devices connect the vehicle structure to the support device, and
 the movement devices are distributed uniformly on the frame component.

11. The vehicle according to claim 10, wherein the plurality of movement devices comprise five movement devices.

* * * * *